United States Patent [19]

Bleier et al.

[11] Patent Number: 4,932,889
[45] Date of Patent: Jun. 12, 1990

[54] CHIPCARD READER

[75] Inventors: Robert Bleier, Untergruppenbach; Eberhard Raab, Untereisesheim; Manfred Reichardt, Weinsberg, all of Fed. Rep. of Germany

[73] Assignee: Amphenol Corporation, Wallingford, Conn.

[21] Appl. No.: 323,999

[22] Filed: Mar. 16, 1989

[30] Foreign Application Priority Data

Mar. 25, 1988 [DE] Fed. Rep. of Germany ....... 3810274

[51] Int. Cl.$^5$ ..................... H01R 13/62; G06K 7/04
[52] U.S. Cl. ..................................... 439/260; 235/482
[58] Field of Search ............... 439/259, 260, 261, 262, 439/263, 264, 152, 76; 235/482, 479

[56] References Cited

U.S. PATENT DOCUMENTS

| | | | |
|---|---|---|---|
| 4,575,703 | 3/1986 | Shishido | 235/482 X |
| 4,724,310 | 2/1988 | Shimamura et al. | 235/482 X |
| 4,734,567 | 3/1988 | Hansbauer | 235/482 |
| 4,735,578 | 4/1988 | Reichardt et al. | 439/152 |
| 4,752,234 | 6/1988 | Reichardt et al. | 439/260 |
| 4,795,897 | 1/1989 | Chalendard | 235/482 |
| 4,799,891 | 1/1989 | Reichardt et al. | 439/43 |
| 4,814,593 | 3/1989 | Reichardt et al. | 439/260 X |

FOREIGN PATENT DOCUMENTS

| | | |
|---|---|---|
| 2952442 | 7/1980 | Fed. Rep. of Germany . |
| 3343727A1 | 6/1985 | Fed. Rep. of Germany . |
| 3343757A1 | 6/1985 | Fed. Rep. of Germany . |
| 3402632A1 | 8/1985 | Fed. Rep. of Germany . |
| 3442397A1 | 5/1986 | Fed. Rep. of Germany . |
| 3531318A1 | 3/1987 | Fed. Rep. of Germany . |
| 3602668A1 | 7/1987 | Fed. Rep. of Germany . |
| 3625306A1 | 1/1988 | Fed. Rep. of Germany . |
| 2594988 | 8/1987 | France ........................ 439/260 |
| 167356 | 1/1986 | Japan .......................... 439/260 |

Primary Examiner—William Briggs
Attorney, Agent, or Firm—Bacon & Thomas

[57] ABSTRACT

A chipcard reader includes an arrangement for guiding a contact support which is reciprocally mounted between an initial position and a reading position. The contact support carries a set of contact elements adapted to contact the contact of chip cards in the reading position. The guiding arrangement causes a lowering movement of the contact support when the contact support is moved form the initial position to the reading position.

26 Claims, 7 Drawing Sheets

CHIPCARD READER

TECHNICAL FIELD

This invention relates generally to a chipcard reader and, more particularly, to a contacting apparatus for a chipcard reader.

BACKGROUND ART

Chipcard readers are known and are adapted to be incorporated into different apparatuses. One such apparatus is a telephone apparatus. The use of such a telephone apparatus will be possible only after the insertion of a proper chipcard. The prior art is represented by German published applications Nos. 29 52 442, 33 43 727, 33 43 757 and 34 02 632. Attention is also drawn to German patent application No. P 38 10 275.7 which was filed on Mar. 25, 1988. Additional prior art is known from German laid open applications Nos. 36 25 306, 36 026 668, 35 31 318 and 34 42 397.

One type of a known chipcard reader uses a stationary component made up of an upper part and a lower part. Within the stationary component a movable part in the form of a so-called contact support (also called "contact element support") is reciprocally mounted. In the upper part and the lower part of the stationary component guide means are provided for the movement of the contact support between an initial position and a reading position. The present invention relates specifically to the further development of a chipcard reader of this type.

If it is intended to insert a chipcard in such a chipcard reader, it is necessary to exert a pushing force onto the chipcard, so as to move the contact support together with the chipcard towards the reading position The contact support together with the chipcard is maintained or fixed in the reading position by a braking or holding means while the contact elements of the contact element support are held in their contacting position.

Generally, the contact support is held in the reading position against a force exerted by return spring means which tend to move the contact support back towards its initial position.

If it is desired to remove the chipcard after the reading operation has taken place, it is necessary to pull the card out of the chipcard reader by pulling at the end of the card projecting out of the chipcard reader, so as to free the card and the contact support from the brake means. During this pulling action the contact support returns towards its initial position primarily due to the action of the return spring means. A chipcard reader of this type is also referred to as a chipcard reader operating according to the push-pull principle.

Chipcard readers have to fulfil a number of strict requirements. Primarily, impeccable contact with the contacts of the chipcard has to be maintained even if multiple use occurs. Moreover, the chipcard reader should be as small as possible, so that it can be used in applications where little space is available. If, for instance, the chipcard reader is to be used in an automobile telephone, the problem of space becomes extremely severe, particularly, if one considers that there is little space in the area of the dash-board and elsewhere in the card for such a reader.

It is an object of the present invention to provide a chipcard reader, particularly one of the push-pull type, in which excellent operating characteristics are achieved and the space requirements are kept small.

It is another object of the invention to provide a chipcard reader which has a small height. It is another object of the invention to provide a chipcard reader which has a width which extends only by a minimal amount or not at all beyond the width of the chipcard. It is also desirable that the depth of the chipcard reader be small.

It is a still further object of the invention to provide a chipcard reader and specifically a contacting apparatus therefor with low manufacturing costs. The low manufacturing costs are due to the low cost manufacture of the components of the reader and also due to the simplified assembly.

Depending on the kind of application, the chipcard reader can be used together with a lower part (base) and also without such a lower part in an apparatus.

SUMMARY OF THE INVENTION

The chipcard reader of the invention has an extremely narrow shape which is specifically due to the fact that the guide means required for the movement of the contact support are located within the circumference or within the width of the chipcard. Because all essential functional elements including the brake means are located in an upper part of the reader, it is possible to use the upper part without the appropriate lower part.

The guide means provided by the invention create a lowering mechanism for the set of contact elements provided in the contact support and thus a meticulous contacting action is achieved between the contact elements of the set of contact elements and the contacts of the chipcard.

In accordance with a preferred embodiment of the invention a further reduction of the required height can be achieved by providing a special transport means.

According to the invention the chipcard brake means are arranged totally in the upper part. In accordance with an embodiment of the invention said card brake means comprise a combination of a metal spring and a plastic part, so as to achieve a high braking force, but also to preserve the card.

In case a lower part (base) is desired by the end user, it can easily be mounted to the upper part by detent means. If no lower part is used, the card support normally provided by the lower part will be provided for by the apparatus within which the chipcard reader is to be installed, so that an additional reduction of the required space is achieved.

As mentioned above, the present invention relates particularly to a chipcard reader where the actuating element is the chipcard. It is the chipcard, which makes sure by being pushed and pulled, that the contact engagement between the chipcard contacts and the contact elements of the contacting apparatus is established and is released.

According to another aspect of the present invention an end position switch is provided which is of integrated design with with the existing set of contact elements. The end position switch is provided such that it will close when the card is inserted and after the chipcard contacts are in contact with the "reading" contact elements, while the "reading" contact elements are opened when the card is pulled from the chipcard reading apparatus. The contact elements may be connected to the apparatus via an insulation displacement connection to a flat cable or flexible circuitry board.

In accordance with another embodiment of the invention the insulation displacement termination end of the contact elements can be modified, e.g., by separating a leg therefrom, such that a soldering termination for a flexible printed circuit is possible.

The brake means provided by the invention apply a braking force onto the chipcard in a direction which is different from the direction of action of the contact force of the reading contacts. In contrast, the prior art uses braking means which act in the same sense or direction as the reading contacts, thus pushing the chipcard away from the reading contacts. The brake means of the invention are only effective during a small percentage of the path covered by the chipcard.

BRIEF DESCRIPTION OF THE DRAWINGS

For a better understanding of the present invention reference may be made to the accompanying drawings, in which.

Figure 1:
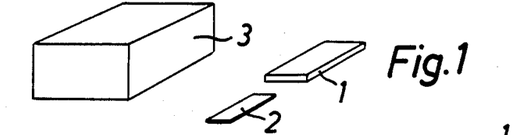
FIG. 1 is a perspective, schematic view of a chipcard reader, a chipcard, and an apparatus, for instance a telephone apparatus, within which the chipcard reader can be installed.

In FIG. 1 reference numeral 3 relates to a schematically shown apparatus, for instance, a telephone apparatus. A chipcard reader (chipcard contacting apparatus) 1 of the invention is adapted to be installed in apparatus 3. After the chipcard reader 1 is installed in the apparatus 3 a chipcard 2 can be used to bring the apparatus 3 into an operative condition due to the insertion of the chipcard 2 into the chipcard reader 1.

Figure 13:
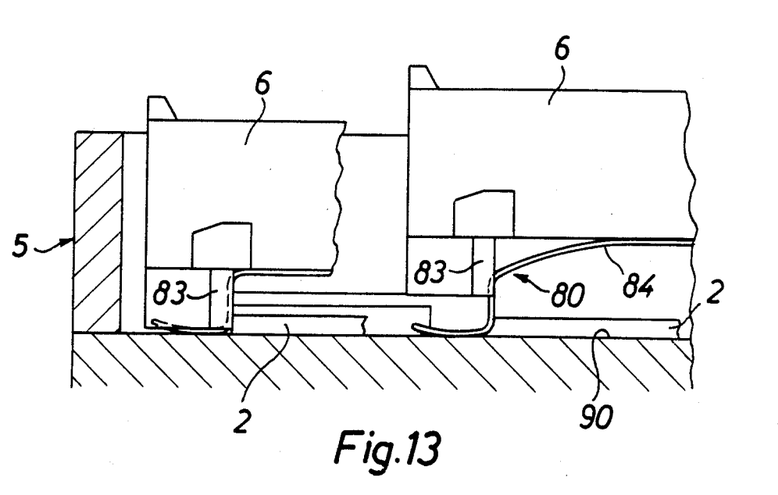
FIG. 13 is a preferred modification of the transport means of FIG. 10.

In FIGS. 2 through 10 as well as 13 to 17 the chipcard reader 1 of the invention is shown in some detail. In connection with FIG. 10 a preferred embodiment of brake means provided for the chipcard reader 1 are shown. FIG. 13 will be used to describe a preferred embodiment of a transport means of a contact support for a set of contact elements (contact element support).

Figure 11:
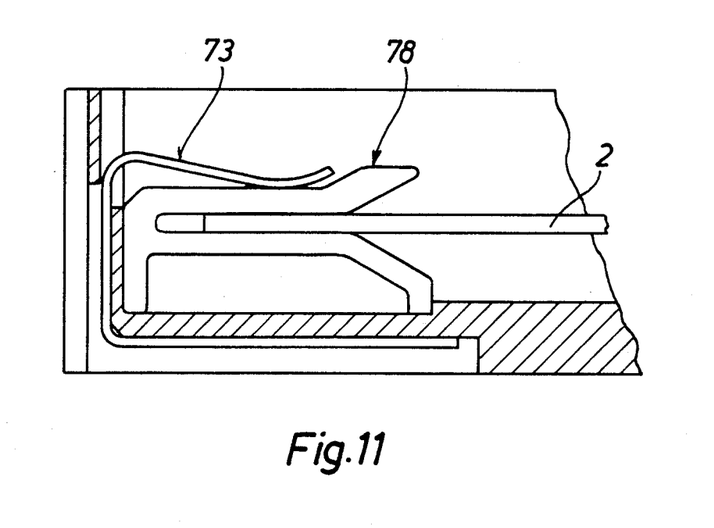
FIG. 11 shows a different design of the card brake means.
Figure 12:
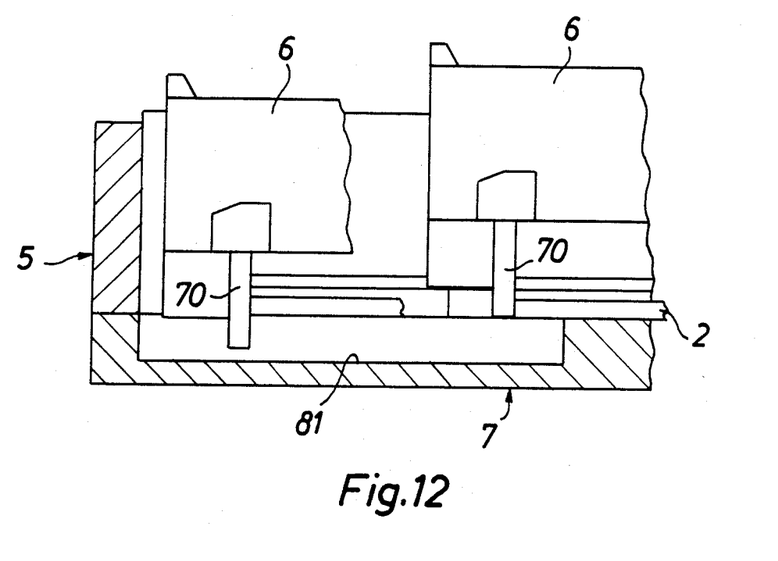
FIG. 12 is a sectional representation of a first embodiment of the transport means of the contact support.

FIGS. 11 and 12 show further modifications of the brake means and the transport means, respectively.

Figure 2:
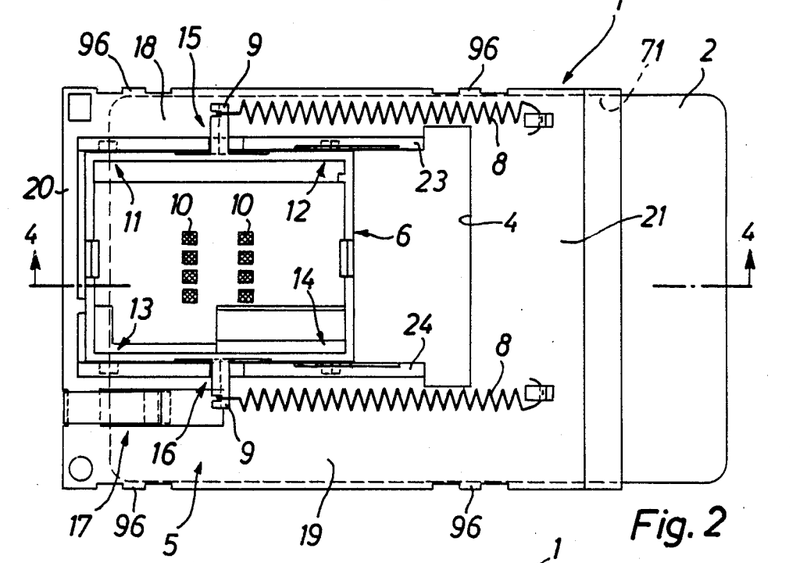
FIG. 2 is a top plan view of an embodiment of a chipcard reader of the invention with the chipcard being shown in the reading position.
Figure 16:
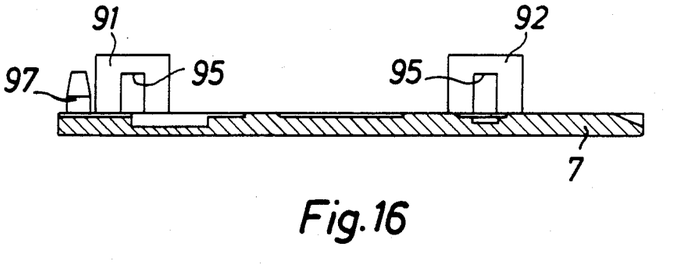
FIG. 16 is a sectional view along line 16—16 in FIG. 17.
Figure 17:
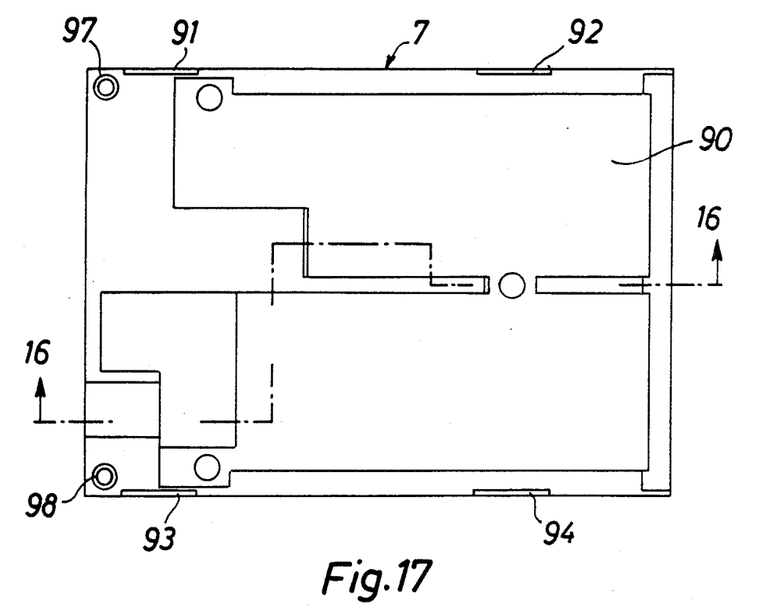
FIG. 17 is a top plan view of the lower or bottom part.

With regard to the design of the chipcard reader 1 reference is now made primarily to FIGS. 2-7. FIG. 2 shows specifically that the chipcard reader 1 includes a stationary component 5 which will also be referred to as upper part or frame 5. Frame 5 can be called an upper part because a lower part 7 can be mounted to frame 5. FIGS. 16 and 17 show a sectional view of lower part 7. It should be noted that in accordance with the invention all required functions of the chipcard reader 1 are realized in the upper part or frame 5 such that the lower part 7 is actually not necessary but can be provided by the apparatus 3 which will then act as the card support.

Frame 5 defines an opening 4 which is limited by two frame side parts 18 and 19 as well as a frame rear part 20 and a frame front part 21.

Figure 3:
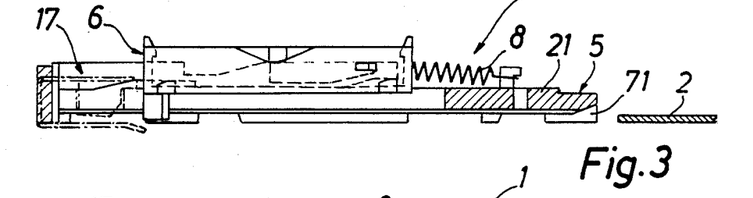
FIG. 3 is a sectional view similar to FIG. 4 with the chipcard as well as its contact support shown in their initial position.
Figure 4:
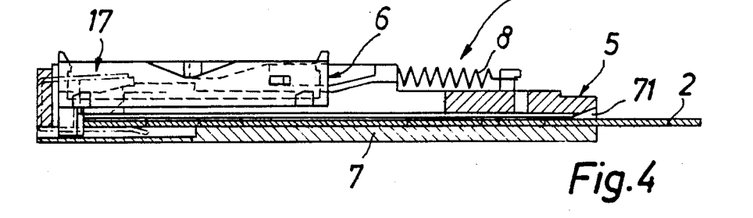
FIG. 4 is a sectional view along line 4—4 with the chipcard and the contact support being shown in the reading position, and the chipcard reader being shown as including an upper part (the so-called frame) and a lower part, the latter of which is also shown in FIGS. 16 and 17.

In the area of the opening 4 a contact support (i.e. a support for contact elements) 6 is reciprocally mounted between an initial position shown in FIG. 3 and a reading position shown in FIGS. 2 and 4. The set of contact elements is not shown in FIG. 3. Return means 8 in the form of two coil springs tend to maintain the contact support 6 in its initial position.

In FIG. 2 the chipcard contacts 10 provided on the chipcard 2 are shown. The contacts 10 are visible, bcause in the shown embodiment the contact support 6 is of a frame-like design which is shown in some detail in FIG. 8 as will be explained below.

Figures 5, 6:
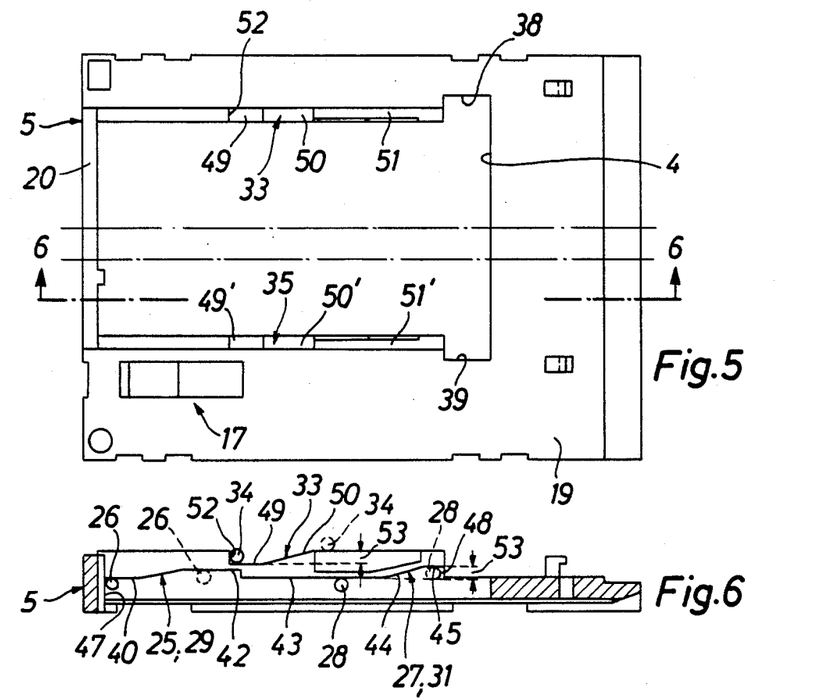
FIG. 5 is a top plan view of the frame of the chipcard reader with the contact support not yet inserted.
FIG. 6 is a longitudinal view along line 6—6 in FIG. 5 with guide means for the contact support being schematically shown.
Figure 7:
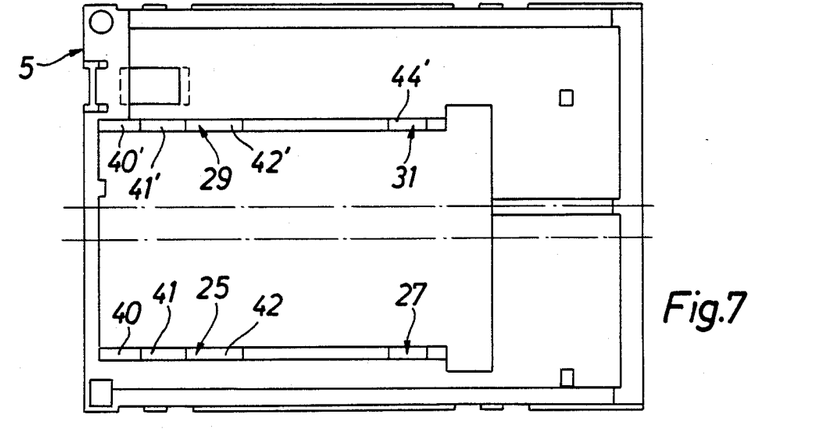
FIG. 7 is a bottom view of the frame shown in FIG. 5.
Figure 14:
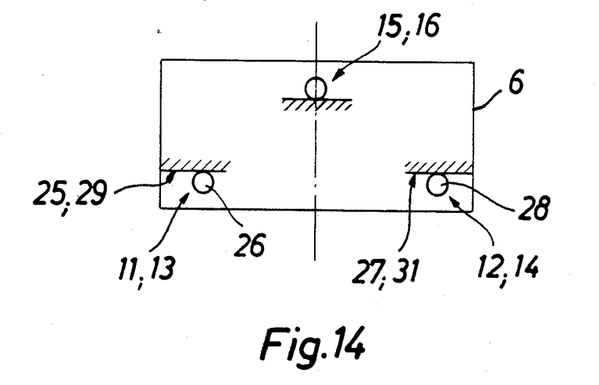
FIG. 14 is a schematical representation of the arrangement of the invention which provides a positive form-fit downward movement of the contact support and consequently also of the set of contact elements.

A further evaluation of FIGS. 2 through 7 and also of FIG. 14 makes it clear that the support and the form-closed or positive coupling or guidance of the contact support 6 at the frame 5 is generally provided by means, especially first through sixth guide means 11-16. Guide means 11-16 allow, in accordance with the invention, a form-closed or positive lowering of the contact support 6 which carries the set of contact elements. This lowering occurs during the movement of the contact support 6 from its initial position (which is shown in FIG. 6 and is represented by three pins 26, 28, 34, which are shown in dashed lines) towards the reading position (which is shown in FIG. 6 by means of three pins 26, 28, 34 shown in solid lines).

The guide means 11-16 are preferably arranged within the perimeter of the chipcard 2 so that a small width is achieved for the chipcard reader 1. The guide means are preferably within the area defined by the longitudinal sides of the frame parts 18 and 19 which are sideways arranged and participate in forming opening 4.

Each of the first through sixth guide means 11-16 comprises a guide located on the side of the frame and a guide located on the side of the contact support. Referring specifically to FIGS. 5, 6, 7 and 14 it will be noted that the embodiment shown includes the following elements. The first guide means 11 includes a first guide on the side of the frame in the form of a first guide path 25, and a first guide located on the side of the contact support in the form of a first guide pin 26 (see also FIG. 8 in this context). The second guide means 12 includes a second guide on the side of the frame in the form of a second guide path 27 as well as a second guide on the side of the contact support in the form of a second pin 28. The third guide means 13 includes a third guide on the side of the frame in the form of a third guide path 29 as well as a third guide on the side of the contact support in the form of a third pin 30. The fourth guide means includes a fourth guide on the side of the frame in the form of a fourth guide path 31 as well as a fourth guide on the side of the contact support in the form of a fourth pin 32. The fifth guide means 15 includes a fifth guide on the side of the frame in the form of a fifth guide path 33, and also a fifth guide on the side of the contact support in the form of a fifth pin 34. The sixth guide means 16 includes a sixth guide on the side of the frame in the form of a sixth guide path as well as a sixth guide on the side of the contact support in the form of a sixth pin 36. The guide paths can also be referred to as cam curves or slide paths.

It is also possible to provide a different number of guide means instead of the exactly six guide means 11-16. For instance, eight guide means or fewer than six guide means could be used.

As was already mentioned, the guide means provided on the side of the contact support are preferably in the form of pins which project laterally away from the contact support 6. This will be described below in some detail referring to FIGS. 8 and 9.

The guides on the side of the frame are preferably provided at longitudinal edges 23 and 24 which extend inwardly from the frame side parts 18, 19. The ridges 23, 24 do not extend along the entire length of the opening 4, but form, as is shown for example in FIG. 5 an assembly opening 38 and 39, respectively. The three point supports (provided for each side of the set of contact elements) allows for the assembly in the frame (or housing upper part) 5 by carrying out a rotary movement into the assembly opening 38 and 39, respectively.

It is feasable to design the guides on the side of the contact support in a different manner. For instance, the pins or similar elements could be located on the side of the frame and the guide paths could be provided on the side of the contact support.

Inasmuch as the guides on the side of the contact support as well as the guides on the side of the frame at the two longitudinal sides of the opening 4 are of symmetric design, the following description is generally devoted to a description of the first, second and fifth guide means 11 and 12 and 15, respectively.

Initially reference will be made to FIGS. 6 and 14. The first guide path 25 includes a plane guide path 40 and contiguous therewith an inclined guide path (also called a lowering curve or pressure application curve) 41 and an additional plane guide path 42 which is located on the higher level (by an amount referred to by reference numeral 53 in FIG. 6) with respect to the guide path 40. Similarly, the second guide path 27 includes a plane guide path 43 and contiguous thereto an inclined guide path (lowering curve or pressure application curve) 44 as well as contiguous with the latter a guide path 43 which is again on a higher level (by the amount 53 shown in FIG. 6) with respect to the guide path 43. Moreover, guide pins 26 and 28 as well as abutments 47 and 48 are formed.

It is also conceivable that the inclined guide paths have a form different from the shown inclined form as long as provisions are made to overcome in a suitable manner the height differential 53 (see FIG. 6).

The descent of the guide paths 41 and 44 is offset in such a manner (see FIG. 6) that the pins 28 and 32, which are located rearwardly with respect to the direction of insertion, will start their lowering movement first. In this manner a delay in the actuation of the end position switch of the set of contact elements is obtained with respect to the actuation or the contacting of the chip card contacts 10 by the reading contacts of the set of contact elements. The end position switch with therefore provide the information about the reached reading position only after the reading contacts have contacted the chip card contacts 10. See in this connection FIG. 15.

The fifth guide path 33 comprises a plane or level guide path 49 and adjacent thereto an inclined guide path 50 and again adjacent to the latter a guide path 51 which is offset in height with respect to the path 49. Moreover, an abutment 52 for the fifth pin 34 is formed such that abutment occurs when the contact support 6 is in its reading position. Between the levels of the plane guide paths 49 and 51 a height differential 53 exists which corresponds to the amount of lowering of the contact support 6 during its movement from the initial position to the reading position. Due to this movement the contact elements of a contact set supported by the contact support 6 have been lowered onto the chipcard contacts 10 after the reading position is reached, so as to contact chipcard contacts 10. It is feasable to provide for a reverse operation.

Because of the symmetric design, i. e. the first guide means 11 correspond to the third guide means 13, the second guide means 12 correspond to the fourth guide means 14 and the fifth guide means 15 correspond to the sixth guide means 16, details of the guide means 13, 14 and 16 will be described by using reference numerals similar to the reference numerals used in connection with guide means 11, 12 and 15. However, a "prime" (') will be added.

Figure 8:
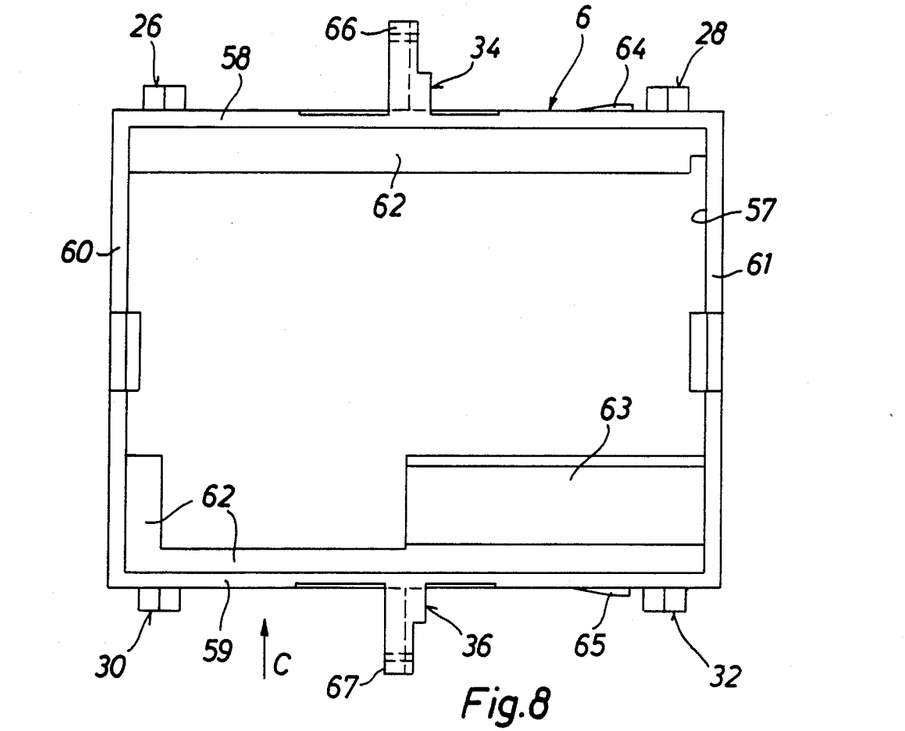
FIG. 8 is a top plan view of the contact support.
Figure 9:
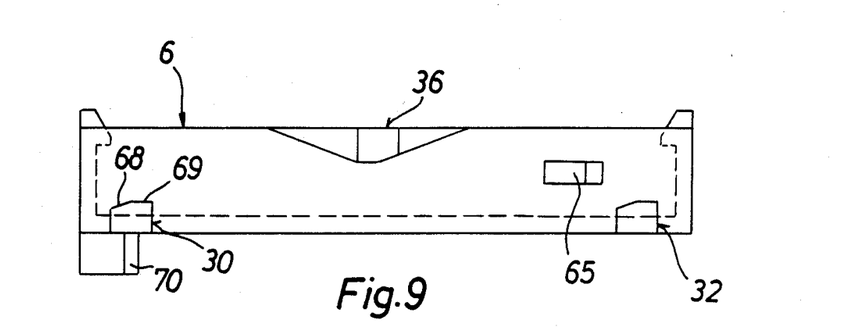
FIG. 9 is a view of the contact support seen from the direction of arrow C in FIG. 8.

Referring now to FIGS. 8 and 9 the contact support 6 will be described. Contact support 6 comprises a center opening 57 which is formed by two side parts 58 and 59, a rear part 60 and a front part 61. Moreover, supports 62 are formed on which the set of contact elements (not shown) is placed and can be fixed. The set of contact elements, in turn, supports the contact elements (reading contacts), which, on one side, can be brought into contact engagement with the chipcard contacts 10 and which, on the other side, can be connected by an insulation displacement connection or by soldering techniques via a flat cable or a flexible circuit to the apparatus 3. It is also conceivable that the set of contact elements is formed integral with the contact support 6. Preferably, the frame 5 is made of plastic material, and specifically by injection moulding.

Pins 26, 28, 30, 32, 34, 36, each includes a plane surface 68 facing towards the guide paths as well as a ramp surface 69; see FIG. 9. Moreover, in the area of the rear part 60, a transport means 70 extending downwardly is provided as is shown in FIG. 9. Transport means 70 will be carried along by the chipcard 2, after chipcard 2 has been sufficiently inserted into the insert opening 71 (FIG. 2) so as to effect a movement of the contact support 6 from the initial position, shown in FIG. 3, into the reading position of the chipcard 2, shown in FIGS. 2 and 4. The movement of the contact support occurs against the force of the two return springs 8.

The chipcard reader operates in accordance with the so-called push-pull principle, i. e. after pushing the card 2 into the reading position, it is held there by brake means 17, and can be pulled out of the reading position after the reading operation has been finished. The brake 17 will be explained in detail in connection with FIGS. 10 and 11, respectively.

Figure 10:
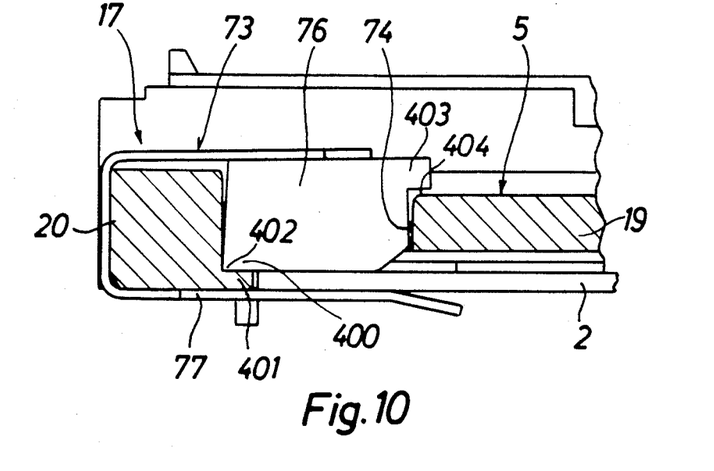
FIG. 10 shows schematically a sectional view of the card brake and holding means of the invention which are also shown in FIGS. 2-4.

The brake means of the invention is arranged solely at the upper part or frame 5. The brake means 17 comprises a metal spring bracket 73 which encompasses, in the area of a corner, the frame back part 20 and also a portion of the frame side part 19. Within the frame side part 19 an opening 74 is provided through which a plastic member 76 can extend towards the bottom side 77 of the frame part 19, so as to come into engagement with the upper surface of the chipcard. One leg of the legs of the spring 73 is in engagement with the bottom surface 77. All in all, the square-shaped plastic part 76 is located with its rear edge part 400 on a projection 401 of the back part 20 and thus forms a point 402 of rotation. When the card 2 is located within the brake means 73 as is shown in FIG. 10, the plastic member 76 is slightly lifted or rotated against the force of the spring 73, i. e. a nose 403 of the plastic part 76 has lifted from the appropriate seat surface 404 at the frame.

If the chipcard 2 is withdrawn, the plastic part 76 will return into the area of the path of insertion of the chipcard.

The brake means 17 of the invention encompasses in a plier-like fashion the chipcard 2 with the spring force being supplied by the metal spring 73, while the plastic part 76 transmits the force to the chipcard 2 without damaging the chipcard. In contrast to the design shown in FIG. 11, the design shown in FIG. 10 provides a lower height.

The brake means design of FIG. 11 uses a clamp or bracket-like plastic part in the form of a plastic spring which is encompassed by metal spring 73. The design of FIG. 11 does not require an opening 74 in the frame side part 19, but it does require a recess at the upper surface of the frame 5 and another recess in the lower part or, alternatively, in the support surface provided in the apparatus in which the chipcard reader is used.

FIGS. 12 and 13 explain two modifications of the transport means 70 of FIG. 9. Thanks to transport means 70 the chipcard 2 carries the contact support along from its initial position to its reading position.

FIG. 12 shows schematically a design with the contact support 6 and its transport means 70 being arranged with respect to a corresponding lower part 7. As mentioned, lower part 7 could also form a part of the apparatus 3. In the right-hand position of the contact support 6, contact support 6 is still on a somewhat higher level which does not yet correspond to the reading position. The level of the reading position is only reached after the left-hand side position is reached by the contact support 6. It can be recognized that a recess 81 has to be provided in the lower part 7, so that the lower end of the transport means 70 can "dive" into the recess.

Similarly recess 81 is provided in the apparatus 3 if the chipcard reader is used without a lower part 7. However, the use of a lower part requires more space.

In FIG. 13 a preferred embodiment of the transport means 80 is shown which comprises an actual transport means 83 and a transport spring 84. It is the task of the transport spring 83 to bridge the free space between the lifted actual transport means 83 and the card support surface 90 as is shown in some detail in said FIG. 13. In FIG. 13 the contact support 6 is shown at the right-hand side in its initial position and at the left-hand side in its reading position. The transport spring 84 is preferably loosely located between the set of contact elements (not shown) and the frame 6 (see abutment surface 63 in FIG. 8). The transport spring 84 provides for a shorter design of the actual transport means 83 compared with the transport means 70 of FIG. 12. The transport spring 84 is twice angled and forms two substantially horizontally extending parts together with a vertically extending part which is arranged therebetween. The transport spring 84 is located with its horizontally extending part on the card surface 90, while the upper horizontal part serves for the fixation of the transport spring 84 at the abutment surface 63.

FIG. 14 shows schematically the three-point support provided in praxi on both sides of the card support 6.

Figure 15:
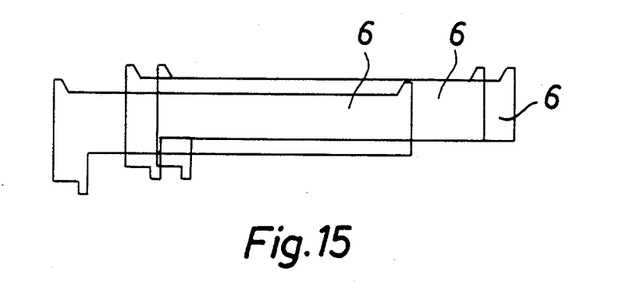
FIG. 15 is a schematic representation of a preferred downward movement for the contact support.

FIG. 15 shows the contact support frame 6 starting at the very right-hand side from its initial position and ending in the reading position which is shown on the far left side. In-between a position is shown where initially the right back end of the frame is lowered.

FIGS. 16 and 17 show the lower part 7, which can be used but does not have to be used. The lower part 7 comprises narrow detent elements 91 through 94 having detent openings 95 adapted to come resiliently into engagement with projections provided at the frame 5. Between the frame 5 and the lower part 7 means are provided for blocking a rotation between the two members. For this purpose oppositely located pins 97 and 98 are provided at the rearward end of the lower part 7. Pins 97 and 98 are adapted for engagement with corresponding bores in the frame 5.

It will of course be recognized that numerous modifications may be made by those skilled in the art to the above-described embodiments which are still within the scope of the invention. The invention, therefore, should not be limited by the above description, but rather should be limited solely by the appended claims.

We claim:

1. A chipcard reader comprising:
   a contact support reciprocally mounted in a frame for movement from an initial position to a reading position when a chipcard is moved from a first position in the reader, said first position defining a plane including the chipcard, to a second position in the reader, and for movement from said reading position to said initial position when the chipcard is moved from the second position to the first position;
   a set of contact elements mounted on said contact support for movement therewith and arranged to contact contacts on the chip card when said contact support is in said reading position; and
   guide means for guiding said contact support during said reciprocal movement such that said reciprocal movement includes a lowering movement of said contact support in a direction away from the plane of initial insertion as said contact support moves from the initial position to the reading position, wherein said movement of the contact support away from the plane of initial insertion and pressing of the contact support against the contact elements is effected by means of four pins, and wherein lifting movement of the contact support towards the plane of initial insertion during movement of the contact support from the reading position to the initial position is effected by means of two pins, each of said four pins and two pins being formed on longitudinal sides of the contact support.

2. A chipcard reader comprising:
a contact support reciprocally mounted in a frame for movement from an initial position to a reading position when a chipcard is moved from a first position in the reader, said first position defining a plane including the chipcard, to a second position in the reader, and for movement from said reading position to said initial position when the chipcard is moved from the second position to the first position;
a set of contact elements mounted on said contact support for movement therewith and arranged to contact contacts on the chip card when said contact support is in said reading position;
guide means for guiding said contact support during said reciprocal movement such that said reciprocal movement includes movement of said contact support in a direction away from the plane of initial insertion as said contact support moves from the initial position to the reading position; and
at a rearward end of the contact support, relative to the direction of insertion, at least one transport member and one shortened actual transport member for transporting said contact support and a transport spring which is inserted together with the shortened actual transport member and which bridges the free space between the shortened actual transport means and the card support surface.

3. A chipcard reader comprising:
a contact support reciprocally mounted in a frame for movement from an initial position to a reading position when a chipcard is moved from a first position in the reader, said first position defining a plane including the chipcard, to a second position in the reader, and for movement from said reading position to said initial position when the chipcard is moved from the second position to the first position;
a set of contact elements mounted on said contact support for movement therewith and arranged to contact contacts on the chip card when said contact support is in said reading position; and
guide means for guiding said contact support during said reciprocal movement such that said reciprocal movement includes movement of said contact support moves from the initial position to the reading position,
and further comprising brake means including a chipcard brake mounted solely on the frame for holding said chipcard in said second position such that the braking force exerted by the brake is neutral with respect to the forces occuring during insertion and withdrawal of the chipcard.

4. The chipcard reader of claim 1 wherein said guide means provide form-fit guidance for said reciprocal movement, including the lowering movement of the contact support.

5. The chipcard reader of claim 1 further comprising means for mounting said frame either to a lower part which forms a card support or to an apparatus which will form said card support which is otherwise provided for by the lower part.

6. The chipcard reader of claim 1 wherein said guide means are arranged such that pushing of said chipcard causes said movement from said initial to said reading position, and pulling of said chipcard causes said movement from said initial position.

7. The chipcard reader of claim 2 wherein a plurality of pairs of said guide means are provided on the frame and also on the contact support.

8. The chipcard reader of claim 2 wherein said chipcard is pushed to cause said movement from said initial to said reading position, and pulled to cause said movement from said reading position to said initial position.

9. The chipcard reader of claim 3 wherein said chipcard is pushed to cause said movement from said initial to said reading position, and pulled to cause said movement from said reading position to said initial position.

10. The chipcard reader of claim 7 wherein a plurality of pairs of said guide means are provided on the frame and also on the contact support.

11. The chipcard reader of claim 9 wherein said guide means provided on said frame are guide paths while the guide means provided on said contact support are pins.

12. A chip card reader comprising:
a contact support reciprocally mounted in a frame for movement from an initial position to a reading position when a chipcard is moved from a first position in the reader, said first position defining a plane including the chipcard, to a second position in the reader, and for movement from said reading position to said initial position when the chipcard is moved from the second position to the first position;
a set of contact elements mounted on said contact support for movement therewith and arranged to contact contacts on the chip card when said contact support is in said reading position; and
guide means for guiding said contact support during said reciprocal movement such that said reciprocal movement includes movement of said contact support in a direction away form the plane of initialinsertion as said contact support moves from the initial position to the reading position,
said guide means including guide pins mounted on the contact support and corresponding guide paths in said frame, said guide paths including a guide path which is inclined in respect to the plane of insertion of the chip card, and wherein planar guide paths parallel to the direction of insertion are provided on both sides of said inclined guide path, said inclined guide path being offset in such a manner that the pins located at the rear of the contact support relative to the direction of insertion are lowered first.

13. The chipcard reader of claim 1 wherein said pins are directly formed on the contact support, and wherein said contact support comprises an additional frame.

14. The chipcard reader of claim 12 wherein at an end of the planar guide paths abutments are provided.

15. The chipcard reader of claim 12 wherein at the end of one of said planar guide paths an abutment is provided.

16. The chipcard reader of claim 1 wherein said pins form a three-point support on both sides of the contact support, one pair of pins being mounted relative to the direction of insertion at the frontal end of the contact support, another pair of pins being mounted at the backward end of the contact support for the lowering movement, and, approximately in the middle between said pairs of pins, another pair of pins is mounted which cause the lifting movement.

17. The chipcard reader of claim 16 wherein return springs are mounted with one end connected to said pins which cause the lifting movement of the contact support, and another end mounted to said frame.

18. The chipcard reader of claim 2 wherein in the reading position of the contact support, the transport spring is extended and the shortened transport member limits the position of the chipcard.

19. The chipcard reader of claim 18 wherein said transport spring is loosely inserted between said set of contact elements and said frame.

20. The chipcard reader of claim 3 wherein said brake means comprises a plastic member, said plastic member providing a defined point of rotation, and an abutment in said frame, and wherein a U-shaped braking spring extends about the abutment.

21. The chipcard reader of claim 3 wherein said brake means comprises a brake spring having two detent noses for fixedly mounting said spring in the upper part of the housing, and a brake spring is arranged such that said chipcard can be held between a brake member and said brake spring.

22. The chipcard reader of claim 3 wherein said brake means comprises a brake member made of plastic material arranged to encompass said chipcard, and a brake spring arranged to act indirectly on the chipcard.

23. The chipcard reader of claim 5 wherein means protecting against rotary movement of the contact element support are provided between the frame and the lower part.

24. The chipcard reader of claim 5 wherein said mounting means includes narrow detent elements provided on the lower part.

25. The chipcard reader of claim 1, arranged such that for termination purposes a flexible printed circuit is used, and wherein termination ends of the contact elements which are arranged to be electrically connected to the flexible printed circuit.

26. The chipcard reader of claim 12 wherein the guide paths are provided on ridges or ribs formed by said frame.

* * * * *